L. E. COOK.
WIND VANE.
APPLICATION FILED JUNE 12, 1919.

1,431,441.

Patented Oct. 10, 1922.

3 SHEETS—SHEET 1.

Inventor:
Lawrence E. Cook.
By his Attorney

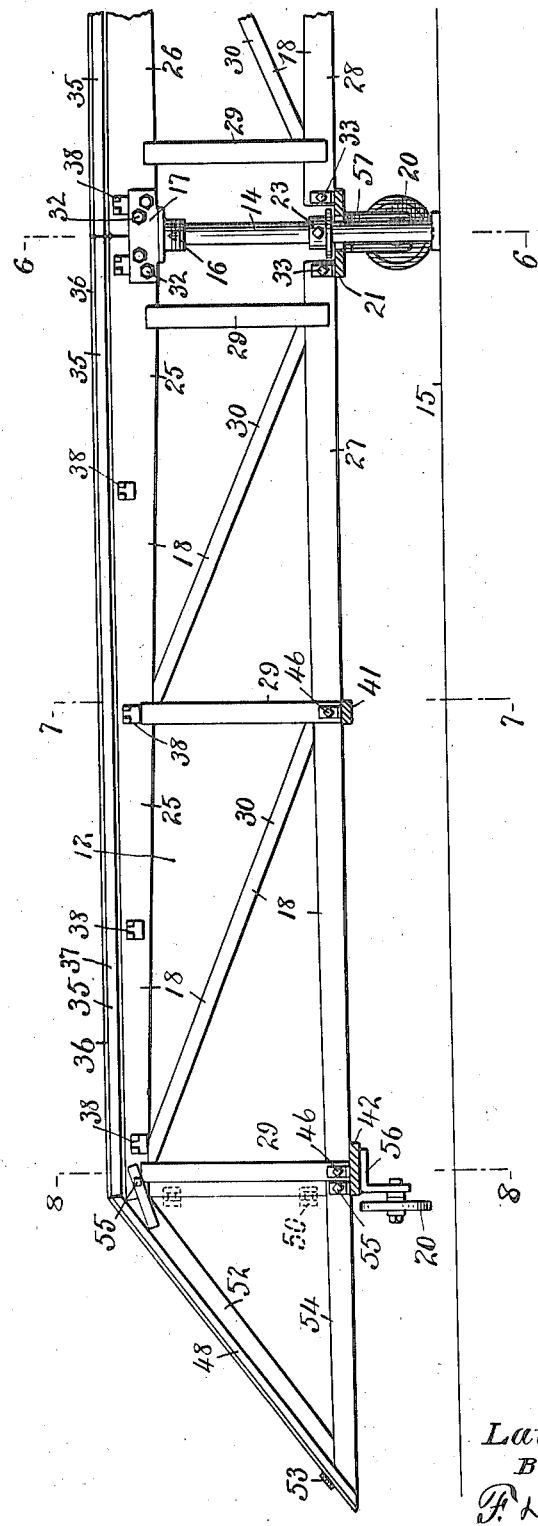

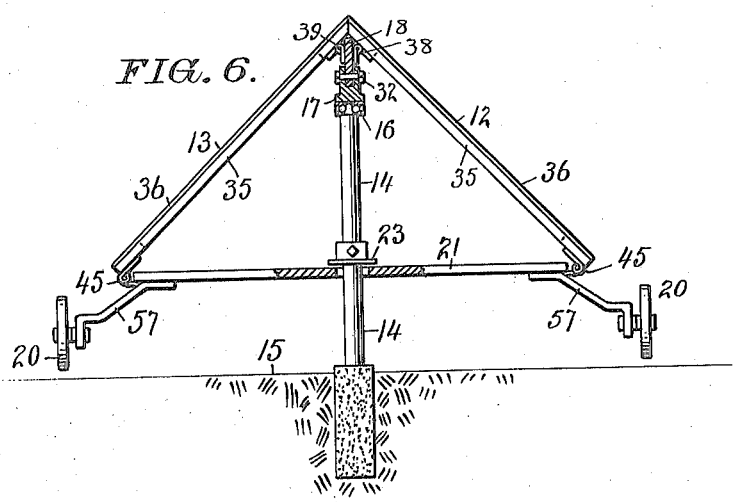
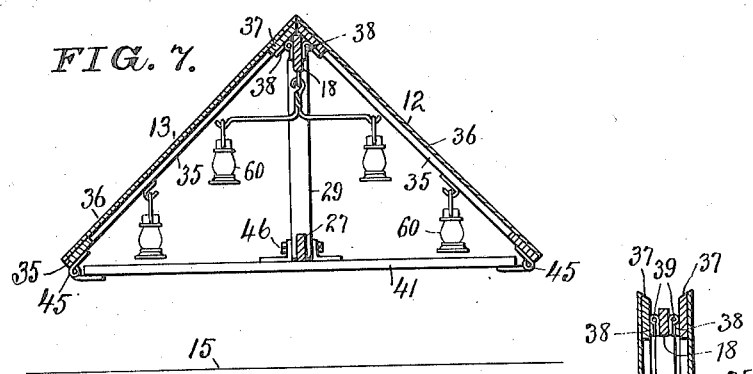
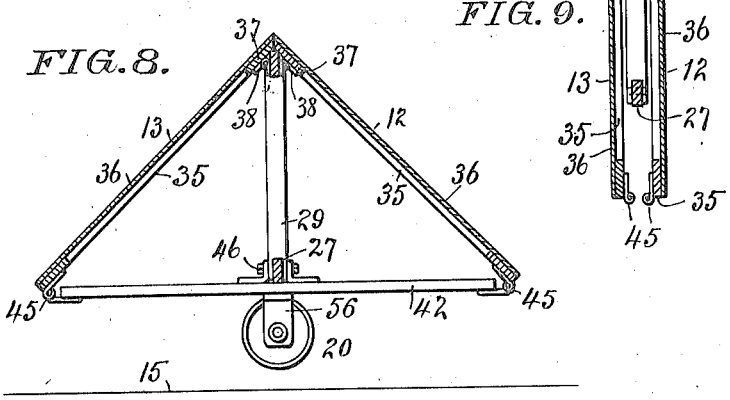

Patented Oct. 10, 1922.

1,431,441

UNITED STATES PATENT OFFICE.

LAWRENCE E. COOK, OF SAN FRANCISCO, CALIFORNIA, ASSIGNOR OF ONE-FOURTH TO HENRY WOODHOUSE, OF NEW YORK, N. Y., AND ONE-FOURTH TO JOSEPH A. STEINMETZ, OF PHILADELPHIA, PENNSYLVANIA.

WIND VANE.

Application filed June 12, 1919. Serial No. 303,803.

*To all whom it may concern:*

Be it known that I, LAWRENCE E. COOK, a citizen of the United States, residing at San Francisco, in the county of San Francisco and State of California, have invented new and useful Improvements in a Wind Vane, of which the following is a specification.

My invention relates to improvements in a wind vane and particularly relates to a wind vane adapted to be used in connection with aviation and located in aerodromes and emergency landing fields.

The object of my invention is to construct a wind vane which may be visible from all angles and particularly from aircraft flying over the place where the wind vane is located, to indicate to the aviator the direction of the wind close to the ground, which information will assist the aviator in making a safe landing by steering into the wind and thus avoiding serious consequences by presuming that the ground wind is blowing in the same direction as the higher air currents; a further object of my invention is to construct the wind vane so that it may be illuminated at night, showing different colors to identify the landing field at night and by painting the wind vane with different colors which will be visible in day time; a still further object of my invention is to construct the wind vane in detachable sections, so that it may be shipped conveniently and readily assembled, as the size of the wind vane is necessarily large, being about forty feet long and eight feet in width, to make it visible from high altitudes; and a still further object of my invention is to construct a wind vane which is so rigid in construction as to withstand severe weather conditions and at the same time so very light in weight that it will turn upon its pivoted bearing by a very slight wind pressure.

These together with various other novel details of construction and arrangement of the parts, which will be more fully hereafter described and claimed, constitute my invention.

Figure 1:
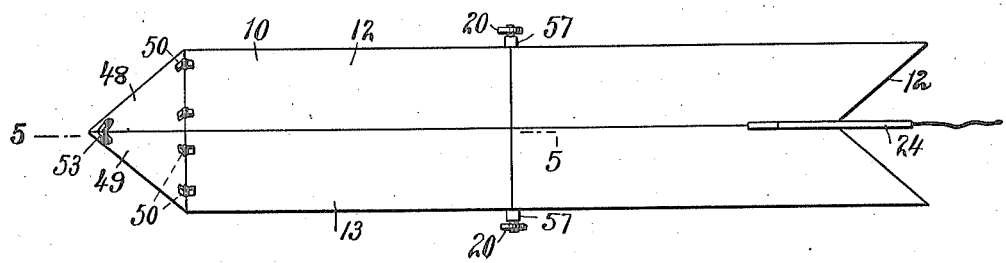
Figure 2:
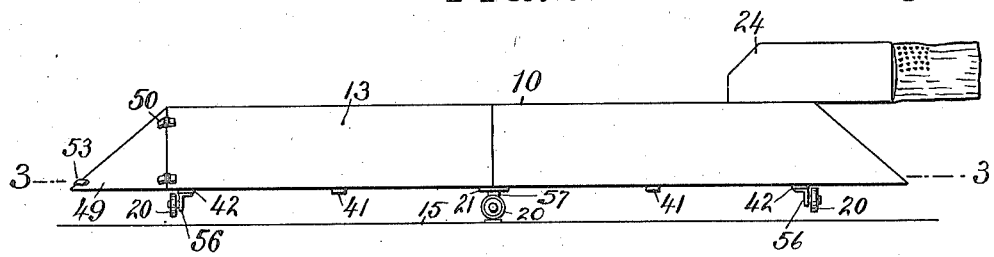
Figure 3:
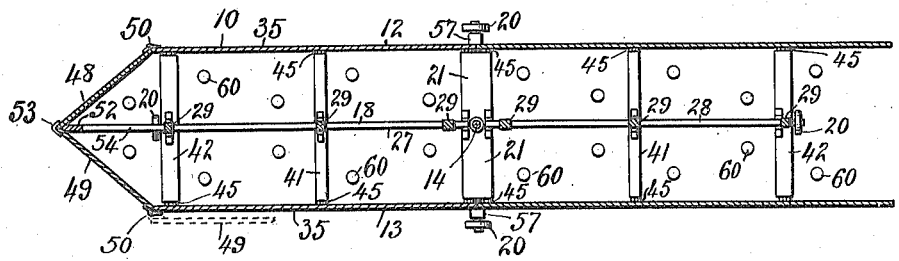
Figure 4:
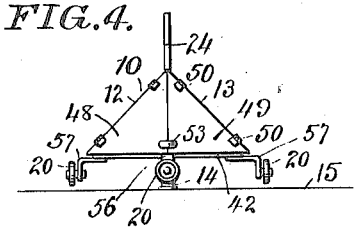

Referring to the accompanying drawings; Fig. 1, is a plan view of my improved wind vane; Fig. 2 is a side view of Fig. 1; Fig. 3 is a horizontal section on line 3—3 Fig. 2; Fig. 4, is an end view of Fig. 2; showing the front end of the wind vane; Fig. 5, is a vertical section on line 5—5 Fig. 1, drawn on a larger scale and showing only the front half of the wind vane; Fig. 6, is a transverse section on line 6—6 Fig. 5; Fig. 7, is a transverse section on line 7—7 Fig. 5; Fig. 8, is a transverse section on line 8—8 Fig. 5; and Fig. 9, is a transverse section, as on line 7—7 Fig. 5, with the cross-pieces removed and the sides folded together upon the central rib, for storage or transportion purposes.

The wind vane 10 has the general formation of an arrow, with a pointed front end and a V-shaped rear end, as shown in Fig. 1. The sides 12 and 13 of the vane are positioned at an angle of forty-five degrees in relation to the central vertical plane so that the vane can be seen from all angles. A light rigid frame work is used in constructing the vane, over which frame is a covering of translucent material.

The vane 10 is supported and balanced upon a central bearing post 14 which is rigidly secured in a base 15, which may be the ground, a platform, or the roof of a building. A ball bearing 16 is provided to reduce the friction between the top of the post 14 and the bearing plate 17 secured to the central rib frame 18 of the vane. Suspended beneath the vane and secured at diametrically opposite points are wheels 20 to limit the tilting movement of the vane and hold it approximately horizontal.

The central cross piece 21 see Figs. 5 and 6, embraces the post 14, and a collar 23 secured to the latter, above the cross piece 21, prevents the vane from being lifted off the post 14, by the wind which may get under the vane.

An actuating vane or fin 24 is secured in a vertical position upon the rear end of the central rib frame 18 and projects sufficiently above and beyond the rear of the wind vane proper, to be acted upon by the wind and turn the vane upon the pivot post, thus always holding the front end of the vane pointing into the wind.

The central longitudinal rib frame 18 consists of the upper members 25 and 26, see Fig. 5, and lower members 27 and 28, posts 29 and braces 30. Said central rib frame carries the weight of the vane. The central rib frame 18 is made in section, preferable in two sections joined together adjacent to the supporting post 14 by the bearing plate 17 and by the central cross piece 21, to which parts 17 and 21, the rib frame members 25—26—27 and 28 are secured by bolts 32 and 33, or other suitable fastening devices by which the parts may be quickly attached and detached.

The sides 12 and 13, of the vane are made of a skeleton frame work 35, covered with canvas 36. The upper strips 37 of the side frames 35 are detachably secured to the central rib frame 18 by hinges 38 having slip bolts 39, which permit the side frames to be readily removed from the central rib 18, or folded against said rib 18, as shown in Fig. 9. The lower edges of the side frames 35 are separated and the frames held out at an angle of forty-five degrees from the central vertical frame by the cross pieces 21—41 and 42, as shown in Figs. 3, 5, 6, 7 and 8. Detachable securing devices 45 are used to secure the side frames to the cross pieces, so that said parts may be readily disconnected. The said cross pieces are also detachably secured to the central rib 18 by bolts 46 which may be readily removed to allow the side frames to be folded together when the cross pieces are removed.

The side frames 35 are made in sections corresponding in length with the length of the sections into which the central rib frame 18 is divided, thus permitting the vane to be divided into convenient lengths for shipping purposes.

The front end of the vane consists of two triangular frames 48 and 49, also covered with translucent material. Said triangular frames 48 and 49 are secured to the ends of the side frames 35 by hinges 50, which permit them to be folded back upon the side frames, as shown in dotted lines Fig. 3. The central rib frame 18 projects forward as shown in Fig. 5, and has a sloping ridge piece 52 to support the free edges of the triangular frames 48 and 49. The latter frames may be secured together at their free edges by a hasp and staple 53 which will permit of their being readily separated, thus making the front of the vane accessible for persons entering the vane to adjust the lights. The front extension pieces 52 and 54, of the central rib frame 18, are detachably connected to the main portion of said frame 18 by bolts 55, or other suitable fastening devices.

The end cross pieces 42 have brackets 56 secured thereto to which the wheels 20 are secured and the central cross piece 21 carries extension brackets 57 on which the wheels are mounted and extend beyond the sides of the vane to better hold the vane and prevent its rocking sidewise.

The vane is illuminated to make it visible at night. Either electric lights or oil lanterns 60 may be used, such as shown in Figs. 3 and 7.

Having thus described my invention I claim and desire to secure by Letters Patent;

1. A wind vane comprising a frame work rotatably mounted, a longitudinal member forming part of the said frame work, and said longitudinal member comprising a display surface extending in a plane at an angle to the central vertical plane of the frame work whereby said display surface may be visible from a position directly above the wind vane.

2. A wind vane comprising, a frame work rotatably mounted, longitudinal side members carried by said frame work, and said side members comprising display surfaces extending in planes at oblique angles to the central vertical frame.

3. A wind vane comprising, a frame work rotatably mounted, longitudinal side members forming part of the said frame work, a covering of translucent material upon said side members, said side members comprising display surfaces extending in planes at oblique angles to the central vertical plane of the frame work, and means for illuminating the said display surfaces.

4. A wind vane comprising, a central rib frame, longitudinal side members having their upper edges located adjacent to each other and sloping downwardly at either side of said central frame so that the cross-section of the wind vane will be of triangular formation and means for rotatably mounting the wind vane.

5. A wind vane comprising, a frame, a central shaft upon which the frame is rotatably mounted, and freely turning wheels mounted at opposite sides of the said pivot shaft and at a distance therefrom to relieve said shaft of the strain caused by the tilting of the wind vane.

6. A wind vane comprising a frame, a bearing upon which the frame is rotatably suspended in a horizontal position, wheels mounted on the wind vane at opposite sides of said bearing, and a base above which the wind vane is normally suspended and upon which said wheels will strike when the wind vane is tilted out of the horizontal position.

7. A wind vane comprising, a central longitudinal rib, parallel side members having their upper edges secured to the said rib, cross-pieces extending at right angles below said rib and attached to the lower edges of the said side members to hold them apart, and means for rotatably mounting the wind vane.

8. A wind vane comprising, a central longitudinal rib, parallel side members having their upper edges hinged to said rib, cross-pieces to hold the lower edges of the side members apart, means for detachably securing the said cross-pieces to the side members, and means for rotatably mounting the wind vane.

9. A wind vane comprising, a central rib, parallel side frames hinged to said rib, means for holding the lower edges of the side frames apart, triangular frame members hinged to the front ends of the side frames and adapted to be folded back upon the side frames, and means for rotatably mounting the wind vane.

10. A wind vane comprising, a central rib frame, side frames detachably secured to said rib frame, said side frames and said rib frame each made in a plurality of longitudinal sections, and means for detachably securing said sections together.

11. A wind vane comprising, a collapsible frame work of triangular cross-section adapted to be detachably secured together, a covering of translucent material upon said frame work, a bearing upon which the frame work is rotatably mounted, wheels mounted upon the under side of the frame work to prevent the wind vane from tilting, a fastening device for holding the wind vane upon the said bearing, and means for illuminating the interior of the wind vane.

In testimony whereof I affix my signature.

LAWRENCE E. COOK.